United States Patent [19]

Kalverkamp

[11] Patent Number: 4,539,799
[45] Date of Patent: Sep. 10, 1985

[54] METHOD AND APPARATUS FOR HARVESTING CORN OR OTHER CEREALS

[76] Inventor: Klemens Kalverkamp, Warendorfer Str. 265, D-4730 Ahlen/Westf., Fed. Rep. of Germany

[21] Appl. No.: 539,653

[22] Filed: Oct. 6, 1983

[51] Int. Cl.³ .......................................... A01D 45/02
[52] U.S. Cl. ......................................... 56/60; 56/66; 56/98; 56/106; 56/500
[58] Field of Search ............... 56/13.8, 13.9, 500–505, 56/60, 119, 98, 64, 66, 104, 105, 113, 106

[56] References Cited

U.S. PATENT DOCUMENTS

| | | | |
|---|---|---|---|
| 2,803,101 | 8/1957 | Lundell | 56/502 |
| 3,127,723 | 4/1964 | Procter et al. | 56/119 |
| 3,240,247 | 3/1966 | Lautzenheiser | 56/500 |
| 3,357,467 | 12/1967 | Morkoski | 56/60 |
| 3,623,298 | 11/1971 | Hitzhusen | 56/60 |
| 3,716,089 | 2/1973 | Bateman | 56/501 |
| 3,828,536 | 8/1974 | Fowler | 56/502 |
| 4,160,355 | 7/1979 | Blake et al. | 56/98 |
| 4,215,527 | 8/1980 | Shriver et al. | 56/98 |
| 4,227,366 | 10/1980 | Pucher | 56/98 |

FOREIGN PATENT DOCUMENTS

| | | | |
|---|---|---|---|
| 261959 | 5/1968 | Austria | 56/504 |
| 1482851 | 10/1969 | Fed. Rep. of Germany | 56/104 |
| 1271226 | 7/1961 | France | 56/60 |
| 2492218 | 4/1982 | France | 56/502 |
| 2522925 | 9/1983 | France | 56/60 |
| 2057238 | 4/1981 | United Kingdom | 56/504 |
| 884608 | 12/1981 | U.S.S.R. | 56/60 |

Primary Examiner—Paul J. Hirsch
Attorney, Agent, or Firm—Hill, Van Santen, Steadman & Simpson

[57] ABSTRACT

The present invention relates to a method for harvesting corn or other cereals with a harvester, particularly a combine attachment for a thresher-harvester, in which the ears of corn or other grains are separated from the plants by way of a single-sided draw of the crop through a gap and is characterized in that a mincing of the crop plants is effected simultaneously with the single-sided draw-through operation. The mincing occurs by a movement of the drawn crop plants relative to a stationary comminution device. A harvester for harvesting corn or other cereals is provided for the implementation of the method, being particularly designed so as to comprise a draw-in device having a gap between a draw-in drum and a shell portion for the draw-through of the crop plants, the gap being disposed across the direction of travel of the harvester, whereby the shell portion is designed for receiving a comminution device for mincing the plants and comprises a row of slots below the draw-in drum for receiving cutter blades therethrough.

24 Claims, 5 Drawing Figures

METHOD AND APPARATUS FOR HARVESTING CORN OR OTHER CEREALS

BACKGROUND OF THE INVENTION

1. Field of the Invention

The present invention relates to a method and to apparatus for harvesting corn or other cereals with a harvester, particularly a combine for a harvester-thresher machine, in which a separation of the ears or other fruits from the plants occurs by way of a single-sided drawing of the crop through a gap.

2. Description of the Prior Art

A harvester for corn or other field crops planted in rows is known from the German published application No. 1,482,851, designated as a combine or attachment for a grain harvester, i.e., a harvester-thresher. The harvester comprises draw-in drums and guide devices for the plants to be harvested, which are disposed at right angles relative to the direction of travel of the harvester. The crop is drawn into the harvester by wheels and, inclined backward, is pulled through the harvester by the draw-in drums. After the harvesting process, the harvest plants remain lying on the ground and are plowed under after subsequent mincing.

SUMMARY OF THE INVENTION

A primary object of the invention is to provide a method and apparatus for harvesting corn or other cereals which, in comparison to the known harvesting process and harvester, permits the crop to be produced in a silo-suited form given better quality of the harvested fruit or, respectively, which permits a more simple and faultless underplowing. The harvester itself should thereby be lighter and more simple in design than the known apparatus.

The principal object of the invention is achieved in that mincing of the harvested plants is also simultaneously accomplished with the single-sided draw-through operation. Advantageously, and deriving due to a chopping of the crop during the harvesting operation, is that a faultless silo produce can be simultaneously produced with the harvesting process or that the harvested plants, uniformly chopped and distributed, can be immediately plowed under.

According to a particular feature of the invention, it is provided that the chopping occurs by a motion of the drawn crop relative to a stationary comminution device. This procedure advantageously makes use of the fact that the corn plant is already being moved during the harvesting operation. Departing from the standard comminution processes involving moving knives, the movement of knives is eliminated in the execution of a cutting operation. This contributes significantly to the simple design and the economical manufacture of harvesters operating in accordance with the method of the invention.

According to another feature of the invention, it is provided that the draw-through and mincing of the crop occurs during motion of the crop at right angles to the direction of travel of the harvester. A movement of the plants at right angles to the direction of travel of the harvester is already known from the German published application No. 1,482,851 mentioned above; surprisingly, however, this motion is also faultlessly and advantageously usable for the commminution of the harvested plants. It is thereby particularly advantageous that the chopping can occur in an oblique direction of the drawn plants. The cutting forces are thereby significantly reduced in comparison to a comminution perpendicular to the fiber. This has a favorable effect on the chopping operation.

According to a further feature of the invention, it is provided that the crop is vertically unguided during the drawing and chopping operations. An oblique attitude of the plant in the lateral direction, which is very advantageous for the cutting operation, thereby occurs, leading with further auxiliary devices to the desired oblique cut guidance of stationary knives relative to the harvested plants. Guide elements, such as wheels and the like can be eliminated so that a further simplification and facilitation of the harvester occurs.

According to a particular feature of the invention, a harvester for harvesting corn or other cereals, being particularly designed as a combine or attachment for a harvester-thresher, is provided, which comprises a draw-in device for the crop which has a plucking gap between a draw-in drum and a partial shell for the draw-through of the crop, which is disposed at right angles relative to the direction of travel of the harvester, whereby the partial shell is designed for receiving a comminution device for chopping the harvested plants. The advantageous execution of the method of the invention is therefore possible.

According to another feature of the invention, the partial shell exhibits a row of slots for receiving cutter blades below the draw-in drum. A particularly simple design of the cutting apparatus is achieved by way of a row of slots for the acceptance of cutter blades below the draw-in drum. The cutting blades only have to be received through the row of slots in order to fulfill their task. The draw-in drum likewise, and in a simple manner, comprises a plurality of vanes each including slots corresponding to the blade positions and the cross-movement of the crop provides an oblique position, which leads to the desired mincing in an oblique direction. The introduction of the slot row into the partial shell is extremely easy so that a very economically-manufacturable cutting apparatus for the crop is provided.

According to another feature of the invention, it is provided that a fastening device, preferably in the form of clamping strips for the cutter blades, is disposed outside of the partial shell, preferably immediately at the partial shell. A particularly simple and rugged execution of the cutting apparatus therefore occurs, also allowing a rapid replacement of dulled cutter blades at the same time. The partial shell and the draw-in drum can remain in position and the dulled cutter blades can be removed from the slot row and replaced after a few screws of the clamping strips have been loosened.

According to another feature of the invention, the partial shell comprises a support edge for the cutting blades and their fastening device at its outside bottom section. An accurate positioning of the cutter blades relative to the partial shell and, therefore, to the draw-in drum as well thereby advantageously occurs, leading to a reliable and simple adjustment of the cutter blades.

According to another feature of the invention, it is provided that the partial shell is designed essentially planar in its upper portion. The planar design of the partial shell in its upper portion advantageously permits a faultless and low-friction cross-movement of the drawn-in plants. In addition, it also sees to it that the plants can advantageously reside nearly perpendicular in the direction of travel both for the harvesting operation of the produce and for the chopping operation. A significant improvement of the harvesting operation and of the draw-in behavior of the plant therefore occurs, in comparison to the known structure. In addition, chopping is also improved.

Another to another feature of the invention, it is provided that the planar portion of the partial shell is oriented nearly perpendicular relative to the ground and forms an angle between 80° and 100° relative to the ground, preferably between 85° and 95°. This is the advantageous, feasible work position of the planar portion of the shell that is necessary for a faultless draw-in operation and a faultless chopping operation.

According to another feature of the invention, it is provided that the partial shell comprises a crushing or breaking edge at the top as a plucking edge, preferably in the form of an iron rod and that a guide and cover plate are disposed at the other side of the gap. A plucking gap for the plants to be harvested therefore occurs, seeing to both a faultless guidance of the plants during the plucking operation and to a faultless breaking of the ear spadix of the crop to be harvested. A faultless harvesting operation is therefore achieved and, in terms of the yield of faultless, unsquashed produce, the harvest result is superior to that heretofore known.

According to a further feature of the invention, it is provided that the partial shell comprise an adjusting screw at its lower end for adjusting the gap between the draw-in drum and the partial shell. Matching to the respective harvest conditions, for example, dry, thin plants or thick, water-retentive plants, is possible. It is also possible to compensate the occurrence of wear.

According to a further feature of the invention, it is provided that the draw-in drums are designed in the form of screws or worms at their plant entry sides, whereby the worm design makes up preferably one-third to one-half of the overall length of the draw-in drum. A further improvement of the draw-in and deflection of the crop therefore advantageously occurs. The appearance of torque peaks is also avoided. A shock-like load of the drive elements and the like, cannot occur so that the same can be designed lighter. In addition, a more uniform operation without vibrations also occurs. The restriction of the chopping length is not harmful when at least half of the draw-in drum is designed as a cutting apparatus. One-third of the length of the draw-in drum of about 400 mm overall normally suffices in the form of a screw in order to achieve a faultless draw-in of the plants.

According to another feature of the invention, it is provided that the harvester comprises a catcher device below the gap between the draw-in drum and the partial shell for chopped plant parts and comprises a conveyor worm. An advantageous interception and elimination of the chopped plants therefore occurs. This is particularly important when the plant is harvested for silo purposes. In case the plant is chopped only in order to facilitate underplowing, the catcher device can be omitted.

According to a further feature of the invention, it is provided that the harvester is designed as a multi-part device and comprises draw-in drum divider tips having draw-in chains, whereby the gathering chains preferably exhibit individual drives, preferably electric or hydraulic motors. Divider tips are not necessary per se for cross-disposed draw-in drums, but it has been shown that they positively influence the overall harvesting operation. Plants standing outside of the row of plants lying on the ground are picked up and supplied to the gap in front of the draw-in drum.

Individual drives for the gathering chains, preferably electric or hydraulic motors as mentioned above, thereby take care of a simple and cost-effective drive of the gathering chains. A further weight reduction of the harvester constructed in accordance with the invention therefore occurs as a result of eliminating heavy gearing and transmission elements.

It is further provided that the gathering chains are designed as belts and comprise, in particular, synthetic material or rubber. A further lightening and simplification of the harvester therefore occurs. In addition, this construction provides for low wear of the components.

Finally, and in accordance with another feature of the invention, the harvester comprises a plurality of identical reaper modules, whereby the module spacings can be set to the row spacing of the crop by separators, spacers or the like. It is thereby advantageously achieved that even different row spacings can be simply accommodated, so that various national pecularities can be taken into consideration. Row spacings of 50 cm and up can be set, at will, with the identical, individual reaper modules.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
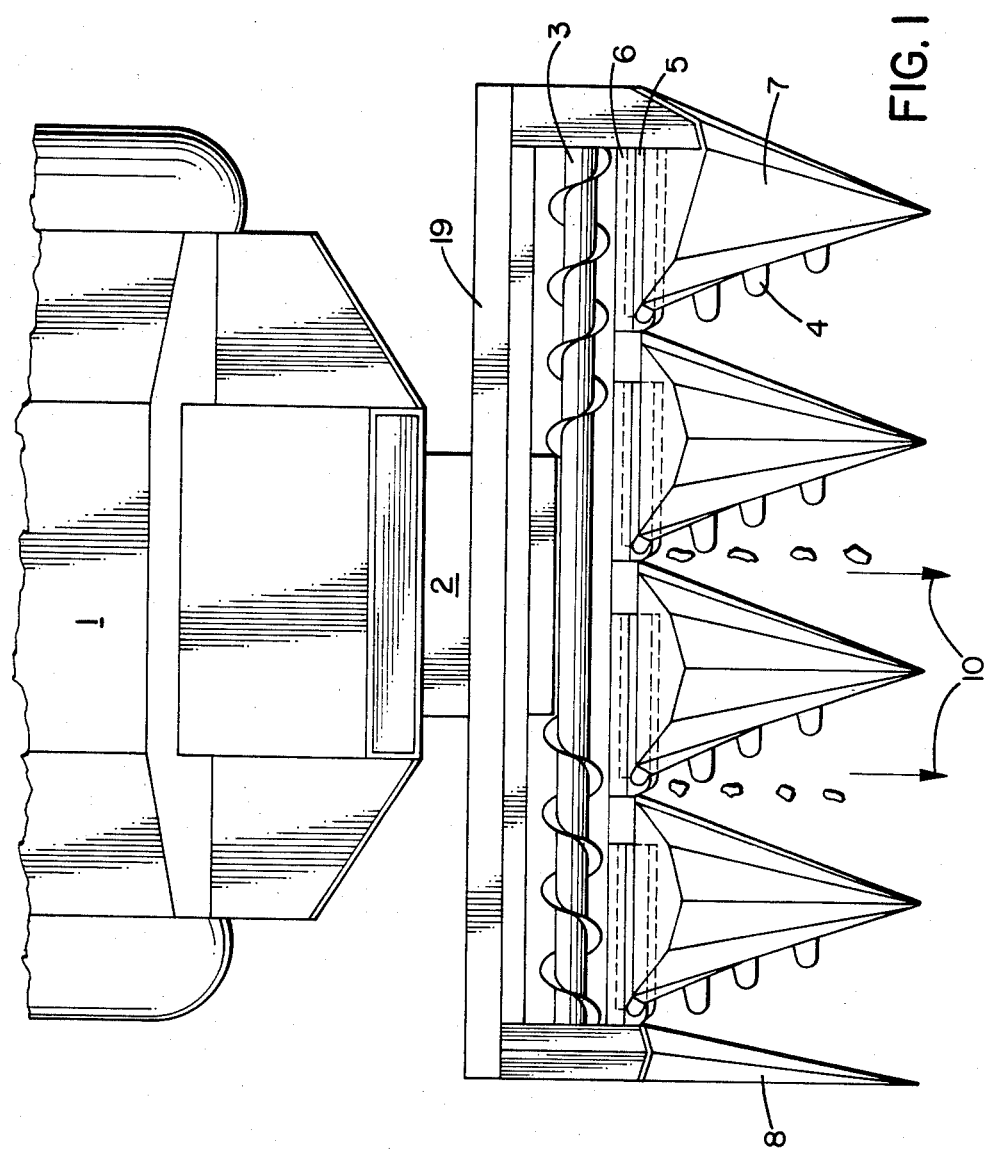
FIG. 1 is a top view of a harvester having cross-disposed plucking gaps in front of a harvester vehicle.

Referring to FIG. 1, a harvester vehicle 1 is provided with a sloping conveyor 2 for the harvested fruits. The harvested fruits are supplied to the conveyor 2 by way of the opposed screw 3 which is located immediately behind cross-disposed plucking gaps 5 having respective shells 6. The transport path of the harvested fruit, for example ears of corn, is advantageously sparingly shortened by this arrangement. The gathering chains extend somewhat obliquely relative to the direction of travel, indicated by the arrows 10. The harvester comprises, in addition to the plucking gaps 5, center dividers 7 and an outboard divider 8. The harvester itself is connected to the harvester vehicle 1 by way of braces which are not illustrated in detail, since they do not form a part of the invention.

Figure 2:
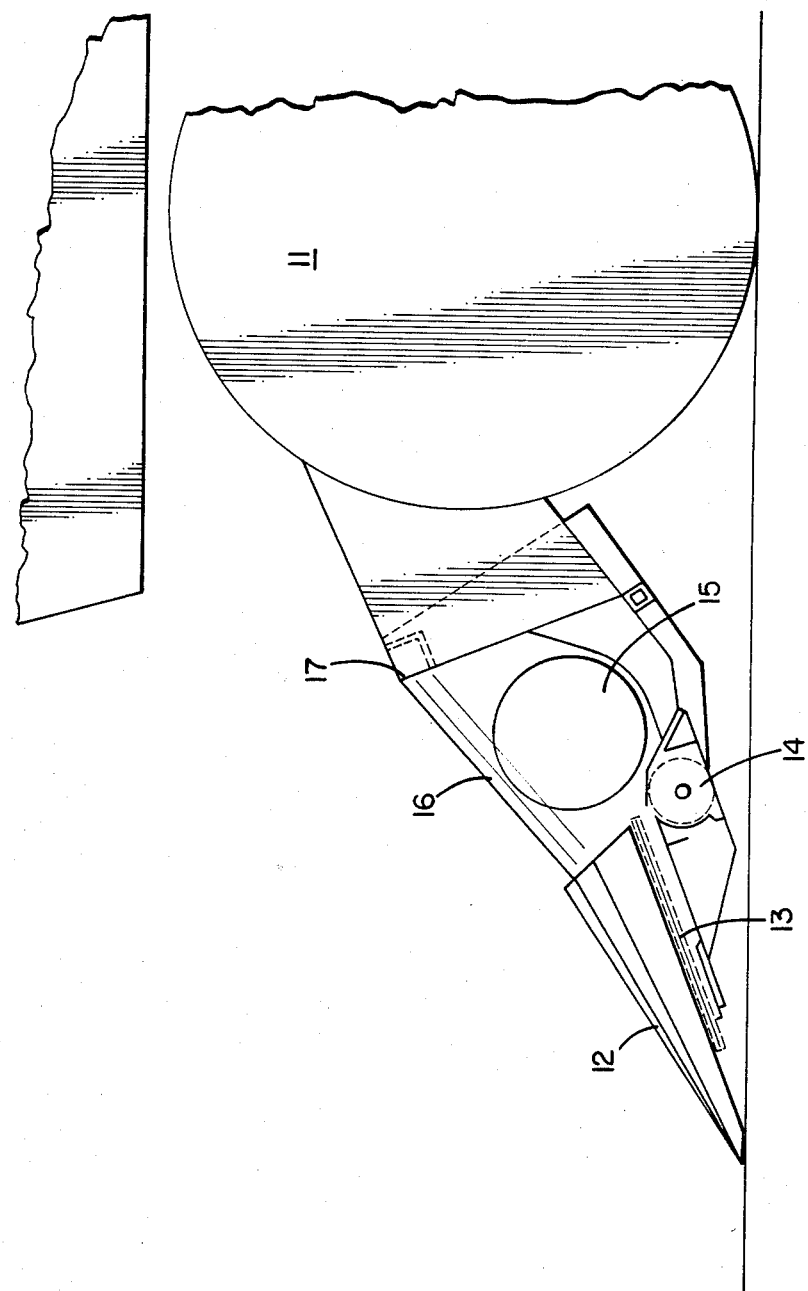
FIG. 2 is a side view of a harvester.

In FIG. 2, a front axle or wheel 11 is illustrated forward of which is a cross-screw conveyor 15 for the grain. The draw-in of the crop occurs by way of a draw-in drum 14 which is disposed to the rear of a gathering chain 13. The gathering chain 13 is located under a divider tip 12 which is designed very short and which directly follows a cover plate 16 over the screw conveyor 15. The harvester itself is connected to the harvester vehicle by way of a quick-release catch located at the line 17 so that easy and rapid replacement by other devices is possible. The angle of incidence of this harvester is approximately 15°. This angle of incidence has proven optimum for the short structure having cross-disposed draw-in drums.

Figure 3:
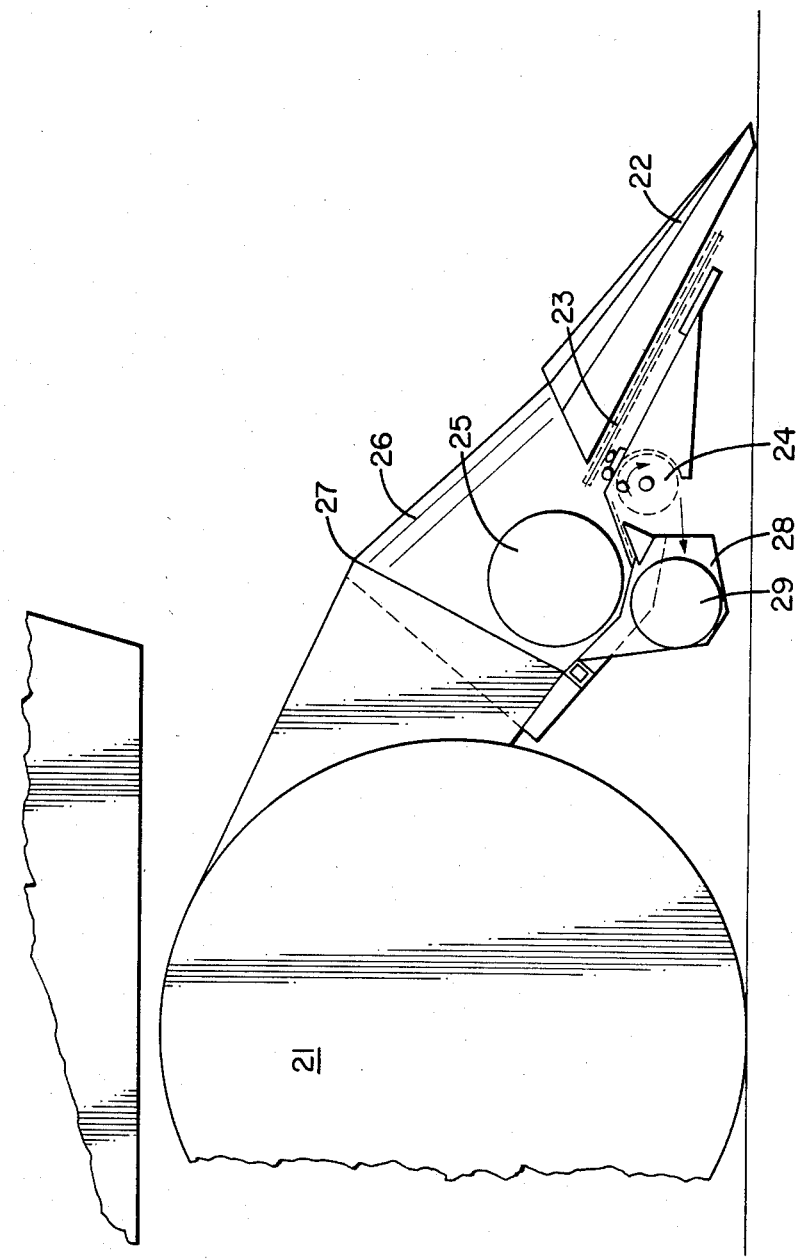
FIG. 3 is a side view illustrating a catcher device for the chopped, harvested plants.

Referring to FIG. 3, the front axle or wheel 21 of a harvester vehicle is illustrated to the rear of a conveyor screw 25 for laterally conveying the harvested crop, such as ears of corn. A further screw conveyor 29 is provided for receiving chopped crop plants and is located beneath the screw conveyor 25, a certain offset toward the front or rear being possible. For the purpose of comminution, the draw-in drum 24 is equipped with cutting blades or the like. The chopped plants are pitched into a catcher basket 28 and are there collected and supplied to the harvester vehicle by way of the screw conveyor 29, being conveyed, by a pneumatic conveyor or the like, for example, onto a truck traveling next to the harvester vehicle.

The divider tip 22 with the gathering chain 23 has an angle of incidence relative to the surface of the ground that is somewhat greater than 15°, for example 20°. As has been shown, such an angle of incidence is not detrimental given cross-disposed draw-in drums. The draw into the cross-disposed draw-in drums is advantageously completely independent of the attack angle of the tips. An even greater angle of incidence, given the arrangement of further units at the underside of the harvester, also turned out not to be detrimental.

The embodiment of FIG. 3 illustrates a particularly favorable execution for a utilization of both the grain and the plant, for silage purposes. This embodiment illustrates the advantages of cross-disposed draw-in drums with integrated mincing in a particularly clear manner.

Figure 4:
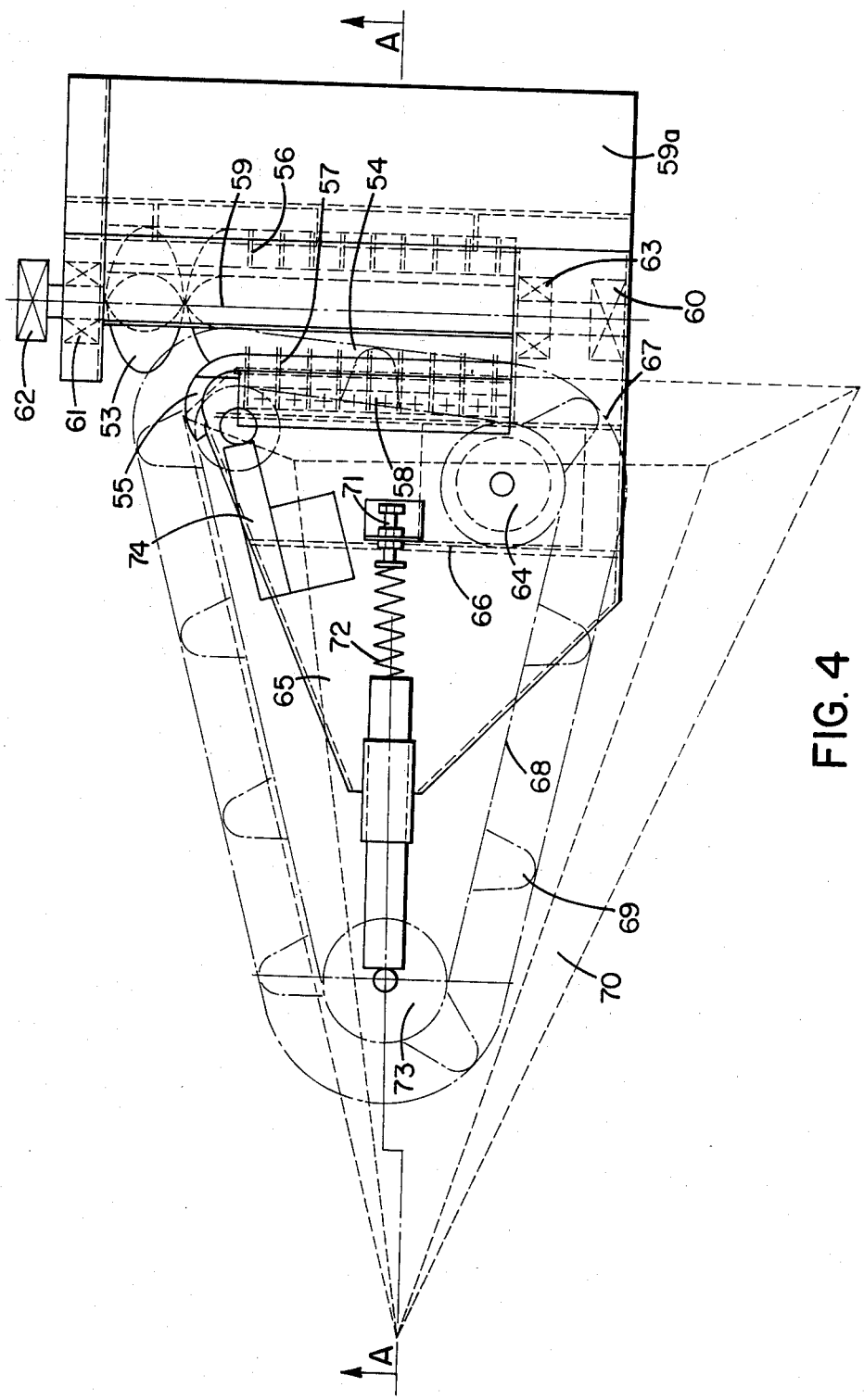
FIG. 4 is a top view of an individual reaper module illustrating an individual divider tip.

In FIG. 4, the outer part 53 of the draw-in drum having screw-like draw-in spirals is illustrated along with a cylindrical part 54 having draw-in vanes extending parallel to the axis of rotation. The ratio of draw-in turns to parallel draw-in vanes lies between $\frac{1}{3}$–$\frac{2}{3}$ and $\frac{1}{2}$–$\frac{1}{2}$. In the illustrated example, it is 1.5–2.5 in a particularly favorable relationship. The plucking or breaking edge 55 is disposed above the portion of the draw-in drum having parallel vanes, the edge 55 developing into a curved guide section into the rows of plants (the plants not being illustrated). The parallel vanes of the draw-in drum part 54 comprise recesses 56 for cutter blades which are clamped by a strip 58, the visible portion being referenced 57. Despite the vertically-disposed cutter blades, the lateral motion of the drawn-in plant surprisingly effects an oblique cut of the plant which considerably reduces the cutting forces in comparison to a comminution perpendicular to the fiber and lends the shreds that are produced a particularly favorable shape.

The individual reaper module illustrated in FIG. 4 comprises a cover plate 59 at its upper side, the front side of the cover plate serving as a guide plate for the drawn-in crop and its rear portion 59a creating the transition to the harvester vehicle. The draw-in drum 53, 54 is laterally seated in bearings 61 and 63 and comprises couplings 60 and 62 at the outboard ends which enable the individual reaper modules to be kinematically connected to one another so that all modules of a harvester require only a single, shared drive disposed laterally at the outside. Therefore, both matching to different row spacings and an economical series fabrication occur given a light and simple construction of the harvester with only a single lateral drive, for example by way of a chain or a V-belt.

The gathering chain 68 has dogs 69 and is driven by a motor 64 which is particularly designed as an electric motor. A particularly light and easily-controllable drive of the gathering chain 68 is therefore provided. An angular gear, however, can also be employed for driving the gathering chain 68, and such gear would then be laterally disposed below the draw-in drum 54.

The gathering chain 68 is tensioned by a spring 72, adjustable by way of a screw 71, and influences the front gathering sprocket 73. The rear chain sprocket, located at the beginning of the plucking edge 55, is held by a support mount 74. The divider tip 65 is disposed above the individual reaper module, being only shown by broken lines. The cutter blades are held by the strip 58, which is covered, the blades being referenced 57.

Figure 5:
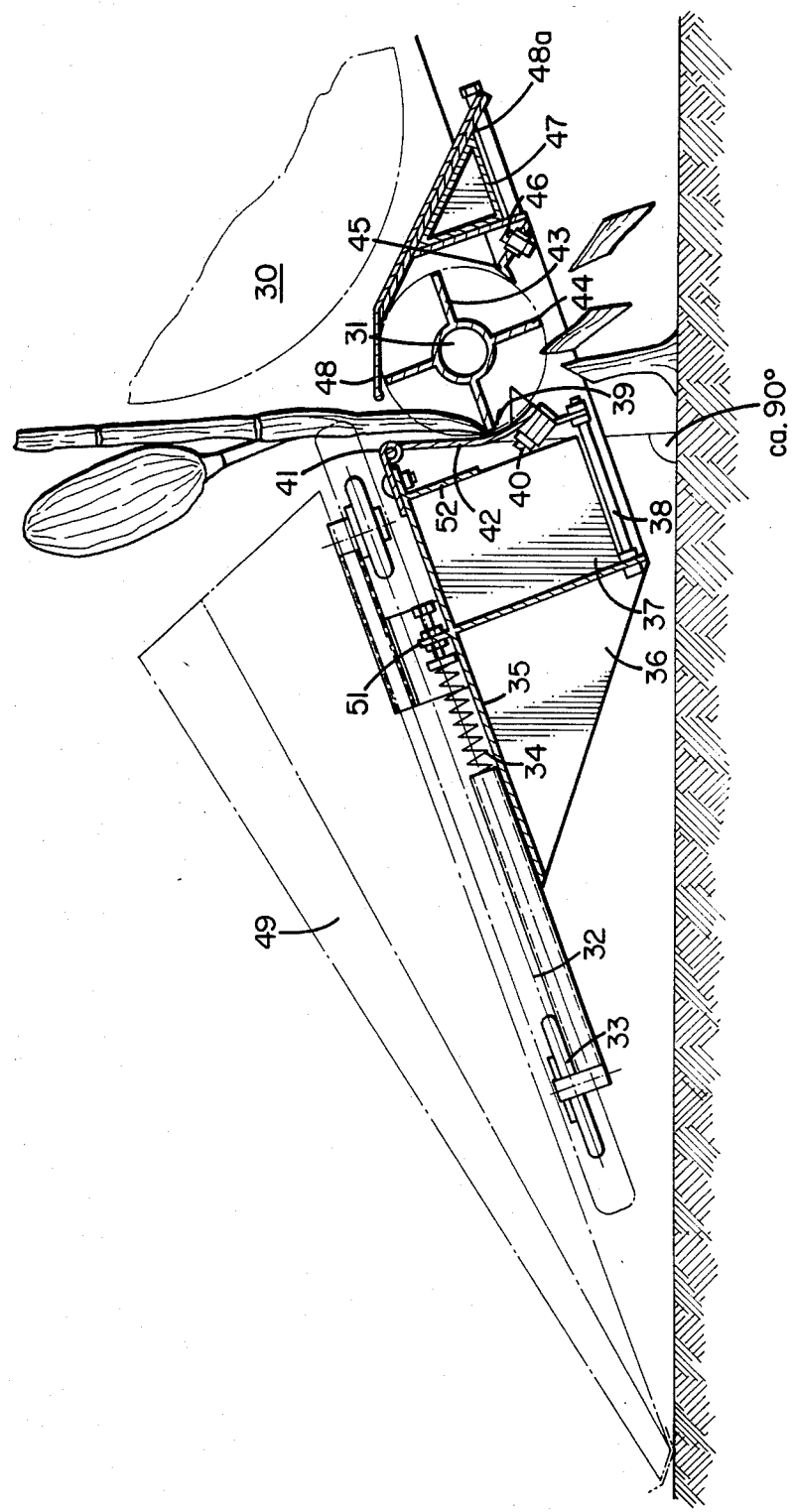
FIG. 5 is a sectional view taken generally along the line A—A of FIG. 4.

In FIG. 5, a screw conveyor 30 is illustrated for the harvested grain along with a draw-in drum 31 with the individual draw-in ridges or arms 43 which have slots for receiving the blades 39. The draw-in drum 31 lies nearly entirely below the guide plate 48. The rear extension of the plate 48 connects the harvester to a main carrier 47 of the harvester vehicle. The blades 39, which are disposed at regular intervals in a row, are clamped by way of screws and a clamping strip 40 so that a simple and easy replacement is possible after loosening the screws and lifting the clamping strip 40. The draw-in drum 31 is cooperatively terminated at the front by a shell portion 42 having a crushing or breaking edge 41. The shell portion 42 is designed planar in its upper section to provide for a good, vertical guidance for the schematically-illustrated plant, providing that the plant is not inclined to the rear during the draw-through operation. A particularly good, clean plucking of the grain therefore occurs with a high quality of crop and low losses. The slope of the planar section of the shell portion 42 is therefore such that an approximately vertical position is achieved in the working position of the harvester.

At its underside, the shell portion 42 has an adjustment screw 38 which permits a general adjustment of the shell portion 42 and by means of which wear potentially occurring at the shell portion 42 or the draw-through arms can be compensated. A stripper blade 42 is secured to a stay of the cover plate 48 by way of a screw 46 at the rear side of the draw-in drum 31. The stripper plate 45 serves to strip leaves and the like that could otherwise wrap around the draw-in drum 31 and the ridges or arms 43. The upper portion of the individual reaper module is formed by a plate 35 which has laterally-attached frame plates 36 and 37. A further reinforcement is achieved by reinforcing ribs 52 so that a shell structure, open towards the bottom, which is both light and resistant is provided.

A spring 34 with an adjusting screw 51 is provided on the upper side of the plate 35, the spring tensioning the front gathering chain sprocket 33 having the draw-in chain 32 engaged therewith. A tensioning of the gathering chain 32 that is aways faultless is therefore assured. The divider tip 49, which is here illustrated by way of broken lines, is located above the individual reaper module.

The chain sprockets 33 in the illustrated example comprise metal, but can also be constructed with synthetic material. The gathering chain 32 can also be designed as a belt on which the plastic dogs are secured. The particularly light construction of the harvester then occurs allowing mounting of the harvester even on relatively small combines.

In a manner heretofore unattained, the harvester of the present invention unites a reaping operation with a plucking of the grain from the plants, which leads to high-quality harvested crops and the possibility of a simultaneous chopping for underplowing or silage. The harvester of the present invention is nonetheless lighter, easier to manipulate and less expensive to manufacture than harvesters heretofore known. As seen from the machine-oriented side, it is therefore possible to pursue corn production in areas in which the attainable yield was heretofore insufficient in order to justify the high machine reinvestment expense of previously-known corn reaping and chopping units.

Although I have described my invention by reference to particular illustrated embodiments thereof, many changes and modifications of the invention may become apparent to those skilled in the art without departing from the spirit and scope of the invention. I, therefore, intend to include within the patent warranted hereon all such changes and modifications as may be reasonably and properly be included within the scope of my contribution to the art.

I claim as my invention:

1. A method of harvesting grain plants, including corn and other cereals, and each plant including grain connected to a stalk, with a traveling harvester, comprising the steps of:
   moving the harvester through a field of the plants while gathering plants of a row with a vertical orientation of the stalk;
   guiding the plants transversely of the vertical orientation and transversely of the direction of movement of the harvester into a plucking gap which includes a fixed plucking edge;
   drawing the stalk of a plant downwardly by engaging the stalk on one side with a rotating draw-in drum and forcing the stalk against the plucking edge to pluck the grain by breaking the grain from the stalk; and
   chopping the stalk into pieces adjacent the plucking gap while continuing to draw the stalk downwardly.

2. The method of claim 1, wherein the step of chopping is further defined as:
   cutting the stalk at an oblique angle with respect to the direction of drawing.

3. A harvester for moving through an harvesting rows of plants which have grain, including corn and other cereals, growing on stalks, comprising:
   gathering means for gathering the plants of a row in a vertical orientation as the harvester moves in the row direction;
   a horizontal plucking gap including a shell carrying a fixed plucking edge extending transversely of the direction of travel of the harvester and transversely of the vertical orientation of the plants, and a rotatable draw-in drum parallel to and spaced from said plucking edge to therewith define said plucking gap;
   guide means coupling said gathering means, said plucking edge and said draw-in drum for guiding gathered plants transversely into said plucking gap,
   said rotatable draw-in drum engaging one side of a plant forcing the stalk against said shell and said plucking edge and simultaneously drawing the plant downwardly so that the grain is plucked from the stalk by said plucking edge; and
   chopping means mounted adjacent said plucking gap for chopping the stalks into pieces while the stalks are being drawn downwardly by said draw-in drum.

4. The harvester of claim 3, wherein:
   said shell comprises a plurality of cutter blades, mounted in a row, below said draw-in drum; and
   said drum comprises a plurality of radially extending vanes each including a row of slots for receiving respective cutter blades, said cutter blades and said slots constituting said chopping means.

5. The harvester of claim 4, wherein:
   said chopping means comprises means adjacent said shell for securing said cutter blades.

6. The harvester of claim 5, wherein:
   said shell comprises outboard edges supporting said clamping means.

7. The harvester of claim 6, wherein:
   said clamping means comprises clamping strips and screws for securing said clamping strips with said cutter blades therebetween.

8. The harvester of claim 4, wherein:
   said shell comprises a planar upper section carrying said plucking edge.

9. The harvester of claim 8, wherein:
   said planar upper section is generally vertical in the working attitude of the harvester.

10. The harvester of claim 8, wherein:
    said planar upper section is oriented at an angle in the range of 80° to 100° with respect to the ground in the working attitude of the harvester.

11. The harvester of claim 8, wherein:
    said shell comprises an arcuate portion extending adjacent said draw-in drum, said clamping means mounting said cutter blades to said arcuate portion.

12. The harvester of claim 11, wherein:
    said shell comprises a rod member on one side of said plucking gap constituting said plucking edge; and
    a guide and cover plate are disposed over said draw-in drum at the other side of said plucking gap.

13. The harvester of claim 12, wherein:
    said shell comprises adjustment means at its lower end for adjusting its spacing relative to said draw-in drum.

14. The harvester of claim 13, wherein:
    said draw-in drum comprises a screw conveyor plant receiving end adjacent said guide means for engaging and moving the plants into said plucking gap.

15. The harvester of claim 14, wherein:
    said screw conveyor plant receiving end extends in the range of one-third to one-half of the length of said drum.

16. The harvester of claim 3, and further comprising:
    catcher means mounted below said chopping means for catching the chopped stalks; and
    a conveyor for carrying the chopped stalks from said catcher means.

17. The harvester of claim 3, comprising:
    a plurality of said gathering means, picking gaps, guide means and chopping means constituting a plurality of reapers;
    each of said gathering means comprising a gathering chain including gathering dogs extending in front of the respective draw-in drum and a divider tip covering said gathering chain and leaving said dogs exposed to engage the plants of the respective roll of plants.

18. The harvester of claim 17, wherein:
each of said draw-in drums comprises an individual drive.

19. The harvester of claim 18, wherein:
each of said drives comprises an electric motor.

20. The harvester of claim 18, wherein:
each of said drives comprises a pneumatic motor.

21. The harvester of claim 18, wherein each of said gathering chains comprises a belt.

22. The harvester of claim 21, wherein:
each of said belts comprises synthetic material.

23. The harvester of claim 21, wherein:
each of said belts comprises rubber.

24. The harvester of claim 17, wherein:
each of said reapers is mounted for adjustment to accommodate different row spacings of plants.

* * * * *